April 2, 1940.   J. A. LIGNIAN   2,195,749
METHOD OF MAKING BEARINGS
Filed Dec. 30, 1937
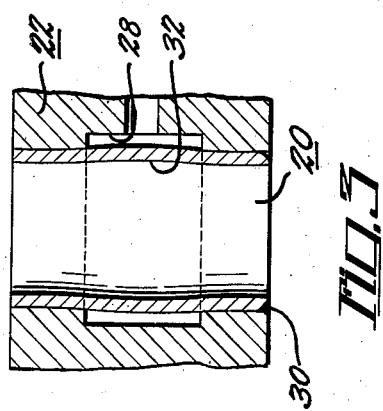
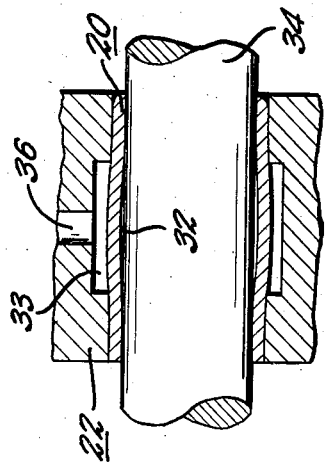
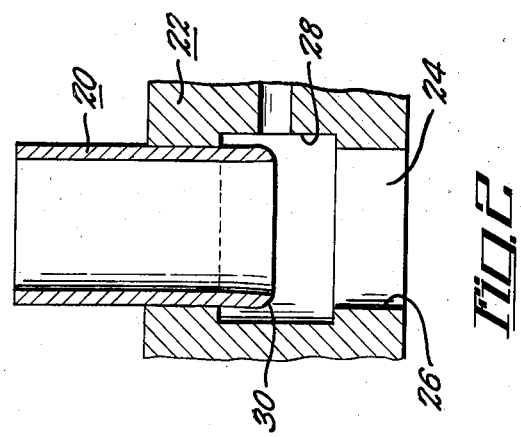
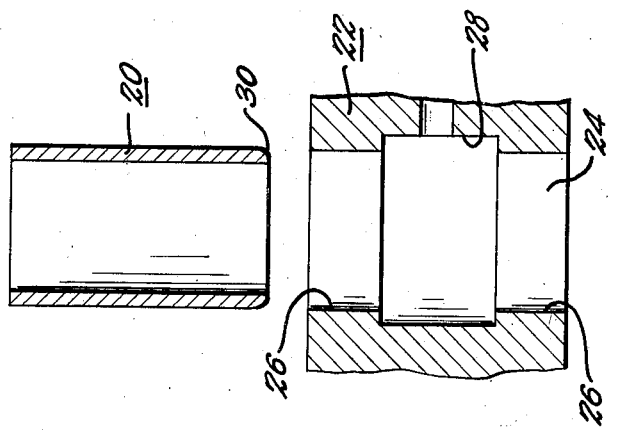
INVENTOR
Jean A. Lignian
BY
Spencer Hardman & Feh.
his ATTORNEYS Patented Apr. 2, 1940

2,195,749

UNITED STATES PATENT OFFICE 2,195,749

METHOD OF MAKING BEARINGS

Jean A. Lignian, Dayton, Ohio, assignor to General Motors Corporation, Detroit, Mich., a corporation of Delaware Application December 30, 1937, Serial No. 182,413

4 Claims. (Cl. 29—149.5)

The present invention relates to lubrication and more particularly to method of forming annular oil recesses in bushings and the like.

One of the objects of the invention is to provide a method for assembling a bushing to a support, which support has a bore therethrough including smaller diameter portions at the ends thereof and a larger diameter intermediate portion, the bushing being pressed endwise into said bore and thereby being radially reduced adjacent the ends thereof and having an expanded intermediate portion that forms an annular oil recess when the shaft is inserted within the bushing.

Further objects and advantages of the present invention will be apparent from the following description, reference being had to the accompanying drawing wherein a preferred embodiment of the present invention is clearly shown.

The present invention is particularly adapted for use with porous metal bushings, such as porous bronze bushings. Bushings of this character are usually fabricated from metal powders, for example, copper and tin powders with a small percentage of graphite mixed therewith for lubricating purposes. The metal powder mixture is briquetted into a self-sustaining article under a suitable high pressure, for example 50,000 to 70,000 pounds per square inch, in a die of the required configuration. The briquetted bushing is then sintered under non-oxidizing conditions at a suitable temperature, for example 1100° F. for a period of about 30 minutes. During this sintering process the tin dissolves the copper to form a porous bronze matrix which includes the graphite uniformly dispersed within the intersticial pores thereof. It is apparent that similar articles can be made by a like procedure from other metal powders, for example, mixtures of iron and aluminum powders, copper and nickel powders, and in fact any metallic powders, the constituents of which are readily soluble in one another.

Porous metal bushings of the type described are usually provided with an oil reservoir disposed around the outer periphery thereof when the bushing is mounted in a supporting member. Oil from the reservoir seeps into the bushing and is fed therethrough to the inner bearing surface by capillarity within the intersticial pores of the bushing. As a rule such a bushing is impregnated with oil or other lubricant prior to its disposition within the bushing support so that the oil from the reservoir merely replenishes the oil supply within the bushing as the same is fed to the bearing surface.

It has been found by careful tests that in certain bushing installations, for example where high temperatures are encountered at a point external of the bushing, that the high temperature is conducted either by the bushing housing, or by the shaft, to the bearing surface of the bushing. In some cases this temperature is sufficiently high to cause decomposition of the lubricant within the pores of the bushing adjacent the bearing surface. The decomposition of the lubricant leaves a residue of carbon within the pores of the bushing adjacent the bearing surface thereof and thus substantially reduces the capillary flow of oil to the bearing surface. Manifestly when such a condition occurs the bearing surface is inadequately lubricated which causes additional overheating and further decomposition of the oil within the pores of the bushing. If this condition is allowed to continue bearing failure is inevitable.

Various alternatives have been suggested and used to assure an oil flow at the bearing surface such as oil grooves, but such alternatives require special machining operations and, therefore, are objectionable from a production standpoint. Furthermore, machining of a porous metal bushing, for example cutting an oil groove therein, usually causes a burnishing action at the machined surface of the bushing which substantially closes the surface pores and thus substantially reduces the rate of oil flow through said pores.

The present invention is directed to a method of forming an oil groove or recess of annular configuration at the inner bearing surface of the bushing without resorting to machine operations.

In the drawing:

Fig. 1 is a fragmentary view of the bushing support showing the bushing in position just prior to its insertion into the support bore.

Fig. 2 is a fragmentary view, similar to Fig. 1, wherein the bushing is partially inserted within the bore.

Fig. 3 is a fragmentary view, similar to Fig. 1, wherein the bushing is completely seated in the support, and Fig. 4 is a fragmentary view illustrating a shaft journaled in the seated bushing.

Referring to Fig. 1, a bushing 20 is shown prior to its insertion within a bushing support 22. The support 22 includes a bore 24 therethrough which comprises two smaller diameter portions 26, adjacent the ends thereof, and an enlarged diameter portion 28 of substantial length intermediate the ends of the support 22. The diameters of the bore portions 26 are substantially identical, or in some cases, slightly smaller than the outer diameter of bushing 20, while the diameter of the intermediate portion 28 of the bore is substantially greater in diameter than the outer diameter of the bushing 20. The end of bushing 20 is chamfered as at 30 to permit ready entry to the bushing into the bore.

Referring to Fig. 2 the bushing is shown partially inserted within the support 22. It will be noted that the bushing 20 is compressed radially inwardly as it passes through the bore portion 26. This compression, due to the inherent resiliency of the bushing causes an outward flaring or "bell-mouthing" at the end of the bushing as the bushing passes into the enlarged bore portion 28. Continued insertion of the bushing 20, as caused by pressure applied endwise of the bushing, causes the same to be seated within the support 22 as shown in Fig. 3. In this position the two ends of the bushing 20 are compressed radially inwardly and thereby held by the bore portions 26 which causes the part of the bushing adjacent the center thereof to expand radially outwardly as at 32. This expanded portion 32 forms an annular groove or recess around the inner periphery of the bushing. In this manner when a shaft 34 is inserted within the bushing 20 it bears thereon at the end portions of the bushing 20 leaving the center portion 32 thereof out of contact of the shaft 34.

The enlarged bore portion 28 also serves to form an oil reservoir 33 with the bushing, which reservoir is disposed around the outside of the bushing. An oil hole 36 is provided so that oil may be introduced into the reservoir 33. The oil in reservoir 33 constantly replenishes the oil within the pores of bushing 20 by capillarity.

The thickness of the bushing wall and the length of the enlarged bore portion 28 are of particular importance to accomplish the aforementioned bulging or expanding of the bushing 20 intermediate the ends thereof. In practice, a bushing having $\frac{3}{16}$" wall thickness has been found to provide an adequate oil recess when using a bushing support having an enlarged bore portion 28 $\frac{5}{16}$" inches long. Such dimensions as are required for specific installations are best arrived at by trial.

From the foregoing it will be observed that the present invention provides a method of forming an annular recess within the bore of a metal bushing without machine operations, such a method is particularly adapted for use with porous metal bushings of the type hereinbefore described, although similar recesses can be formed in metal bushings fabricated by other processes in which the metal of the bushing has sufficient inherent resiliency to bulge radially outwardly at the center thereof when the end portions thereof are compressed radially inwardly.

While the embodiment of the present invention as herein disclosed, constitutes a preferred form, it is to be understood that other forms might be adopted, all coming within the scope of the claims which follow.

What is claimed is as follows:

1. The steps in the method of assembling a thin walled porous metal bushing to its support and simultaneously forming an annular oil recess in said bushing, comprising; providing a bushing support having a bore therethrough adapted to receive said bushing, said bore including end portions of slightly less diameter than the outside diameter of said bushing, and having an enlarged diameter portion intermediate said end portions; forcing the bushing endwise into said support for compressing the end portions of the bushing radially inwardly, and causing the center portion thereof to bulge outwardly and form an annular oil recess, the thickness of said bushing and the length of said large diameter portion in the support having a ratio in the order of 3:5.

2. In a method of assembling a thin walled ductile metal bushing to its support, that step of pressing the bushing endwise into the bore of a support wherein the diameter of the bore is smaller at the ends than the diameter of the bushing and wherein the intermediate portion is of substantial length and of a larger diameter than the diameter of the bushing, for radially reducing the diameter of the bushing at its two end portions only and for slightly expanding the intermediate portion thereof.

3. The steps in the method of forming an annular oil recess within the bore of a thin walled porous metal bushing comprising, sintering together metal powders to form a porous metal bushing, and then forcing said bushing into a support by pressure applied endwise of the bushing, said support having a bore therein of slightly smaller diameter at the ends thereof than the outside diameter of the bushing and having an enlarged diameter portion of substantial length intermediate the ends thereof, for causing the bushing to be compressed radially inwardly by the smaller diameter portions of the support and for causing the intermediate center portion of the bushing to expand radially outwardly within the enlarged portion of the support, and thereby provide an annular oil recess within the bushing bore.

4. The steps in the method of forming an annular oil recess within a thin walled porous metal bushing comprising, sintering together powdered metals to form a porous metal bushing and forcing said bushing into the bore of a support by pressure applied endwise of the bushing for seating the bushing in said support, said support having reduced diameter portions at the ends thereof and an enlarged diameter portion intermediate the ends thereof, said bushing having such a wall thickness and said bore having such diameters that the bushing is compressed radially inwardly at the ends thereof and is expanded radially outwardly intermediate the ends thereof to form an annular oil recess.

JEAN A. LIGNIAN.